United States Patent
Oteri

(12) 
(10) Patent No.: US 6,715,577 B2
(45) Date of Patent: Apr. 6, 2004

(54) FORE-END ASSEMBLY WITH IMPROVED SHOCK ABSORBING MEANS FOR MOTORCYCLES

(76) Inventor: Massimo Oteri, Via Don Girotti, 49, 20049 Concorezzo (Milano) (IT)

(*) Notice: Subject to any disclaimer, the term of this patent is extended or adjusted under 35 U.S.C. 154(b) by 0 days.

(21) Appl. No.: 10/119,643

(22) Filed: Apr. 10, 2002

(65) Prior Publication Data
US 2002/0149169 A1 Oct. 17, 2002

(30) Foreign Application Priority Data

Apr. 10, 2001 (IT) ................................ MI2001A0770

(51) Int. Cl.⁷ .............................................. B62K 21/02
(52) U.S. Cl. ...................... 180/219; 280/275; 280/276
(58) Field of Search ................ 180/219; 280/275–277, 280/279

(56) References Cited

U.S. PATENT DOCUMENTS

| | | | | |
|---|---|---|---|---|
| 4,401,316 A | * | 8/1983 | Miyakoshi et al. | 280/277 |
| 4,756,547 A | * | 7/1988 | Trema | 280/276 |
| 4,785,905 A | * | 11/1988 | Trema | 180/219 |
| 5,361,864 A | * | 11/1994 | Tanaka | 180/219 |
| 5,417,305 A | * | 5/1995 | Parker | 180/219 |
| 6,402,175 B1 | * | 6/2002 | Jansson | 280/276 |

* cited by examiner

Primary Examiner—Lesley D. Morris
Assistant Examiner—L. Lum
(74) Attorney, Agent, or Firm—Hedman & Costigan, P.C.

(57) ABSTRACT

A fore-end assembly for a motorcycle including an improved shock absorbing assembly, characterized in that the fore-end assembly comprises a single shock absorbing element coupled to the motorcycle chassis, and supporting, at the bottom thereof, at least an arm for supporting the front wheel of the motorcycle.

6 Claims, 3 Drawing Sheets

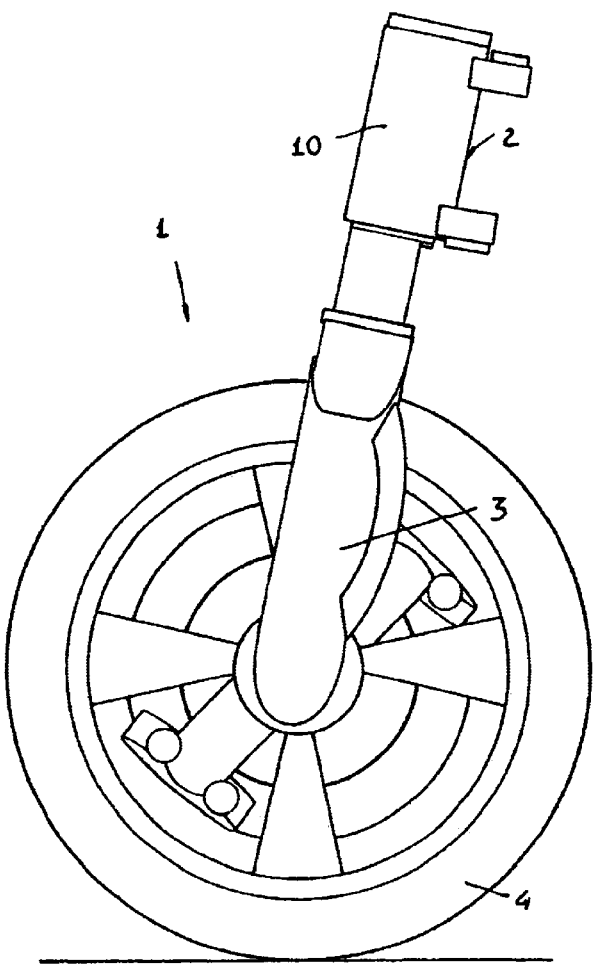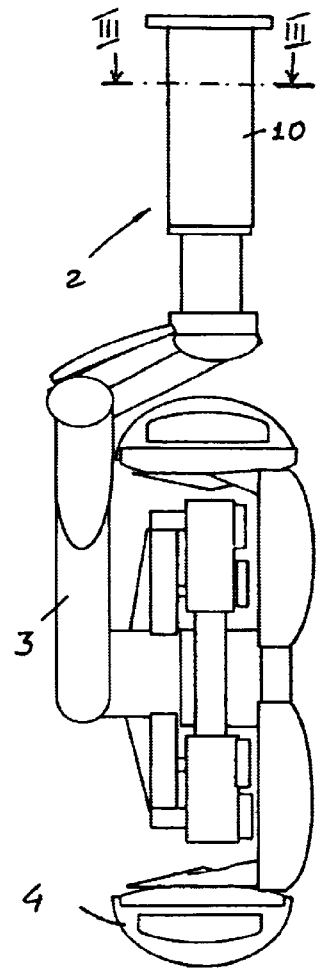
FIG. 2      FIG. 1
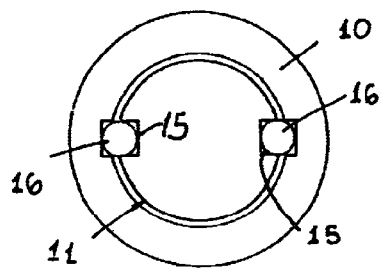
FIG. 3

US 6,715,577 B2

FORE-END ASSEMBLY WITH IMPROVED SHOCK ABSORBING MEANS FOR MOTORCYCLES

BACKGROUND OF THE INVENTION

The present invention relates to a fore-end assembly with improved shock absorbing means for motorcycles.

A very important problem in making motorcycle frameworks or chassis assemblies is that to reduce the chassis weight without lowering the mechanical strength thereof.

In particular, very great problems are encountered in making the fore-end assembly, or front fork assembly, because of the comparatively high weight due to the provision of telescopic shock absorbers on the fork tines.

Such an arrangement, while being broadly diffused, generates great problems deriving from the comparatively high inertia of the system and from the long time required by the shock absorber to provide a useful response.

SUMMARY OF THE INVENTION

Accordingly, the aim of the present invention is to overcome the above mentioned drawbacks, by providing a fore-end assembly for motorcycles, including an improved shock absorber system, allowing to greatly reduce the fore-end assembly weight, thereby solving all the mechanical problems deriving from the great inertia of prior systems.

Within the scope of the above mentioned aim, a main object of the present invention is to provide such a fore-end assembly for motorcycles, which can be constructed according to several different constructional arrangements, all provided for simplifying the assembly mechanical construction, while providing a possibility of using a broad range of solutions directed from the motor vehicle field.

Another object of the present invention is to provide such a motorcycle fore-end assembly which, owing to its specifically designed constructional features, is very reliable and safe in operation.

Yet another object of the present invention is to provide such a fore-end assembly for motorcycles, including an improved shock absorbing system or means, which can be easily made starting from easily available elements and materials and which, moreover, is very competitive from a mere economic standpoint.

According to one aspect of the present invention, the above mentioned aim and objects, as well as yet other objects, which will become more apparent hereinafter, are achieved by a fore-end assembly for motorcycles including improved shock absorbing means, characterized in that said fore-end assembly comprises a single shock absorbing element coupled to a motorcycle chassis, and supporting, at the bottom thereof, at least an arm for supporting the front wheel of said motorcycle.

BRIEF DESCRIPTION OF THE DRAWINGS

Further characteristics and advantages of the present invention will become more apparent hereinafter from the following detailed disclosure of a preferred, though not exclusive, embodiment of a fore-end assembly for motorcycles, including an improved shock absorbing system or means, and being illustrated, by way of an indicative, but not limitative, example, in the figures of the accompanying drawings, where:

FIG. 1 is a schematic front view showing a fore-end assembly for motorcycles according to the present invention;

FIG. 2 is a schematic side view illustrating the tore-end assembly according to the present invention;

FIG. 3 is a schematic cross-sectional view substantially taken along the line III—III of FIG. 1;

DESCRIPTION OF THE PREFERRED EMBODIMENTS

Figure 4:
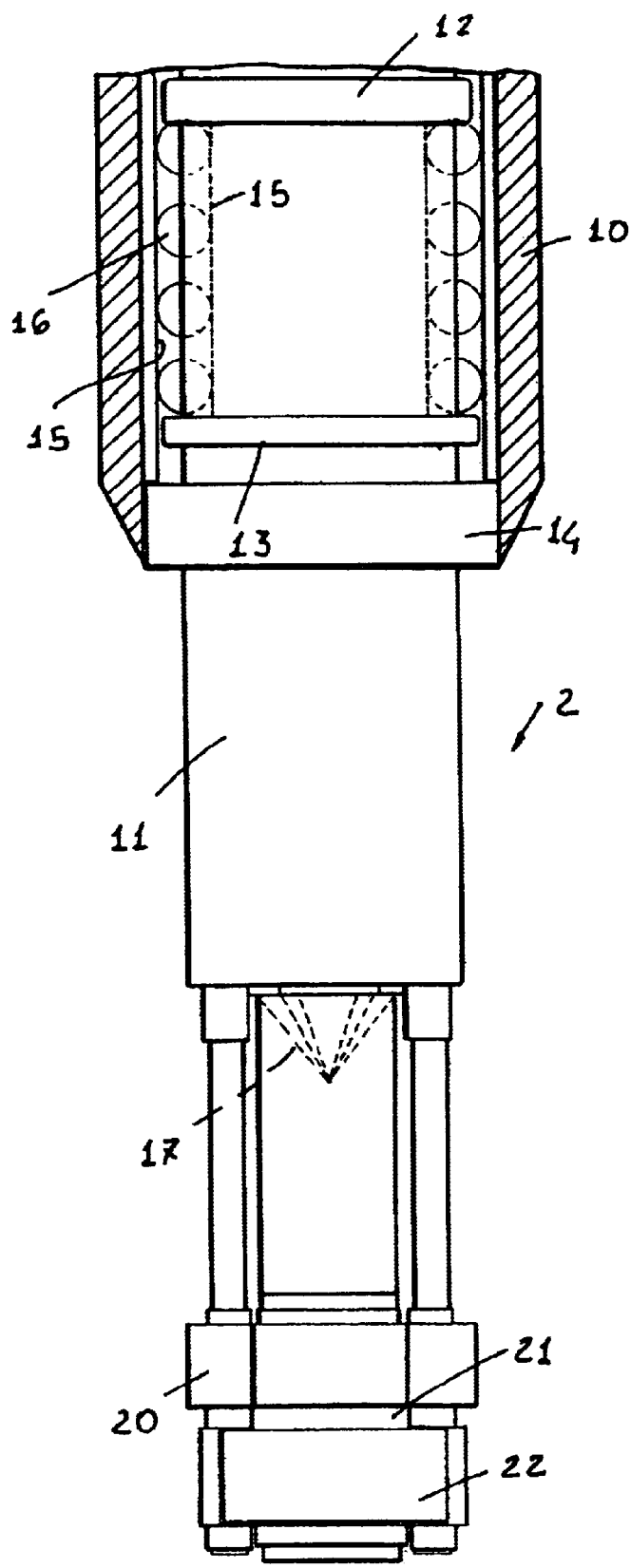
FIG. 4 illustrates the shock absorbing element.

With reference to the number references of the above mentioned figures, the motorcycle fore-end assembly, including an improved shock absorbing system or means according to the present invention, which has been generally indicated by the reference number 1, comprises a single shock absorbing element, generally indicated by the reference number 2, which can be arranged both on the median plane of the wheel, both in an adjoining relationship with respect to said wheel.

The main feature of the present invention is that it provides to use a single shock absorbing element, allowing to reduce the motorcycle chassis weight, while providing good mechanical strength characteristics.

The shock absorbing element 2, as shown in FIG. 1, is coupled, at the bottom thereof, to a wheel supporting arm 3, for supporting the motorcycle wheel 4, which wheel supporting arm 3 can be either a left or a right arm.

It would be also possible to use a conventional fork assembly, in which case the shock absorbing element will be arranged at the top, at the central region of the assembly.

Figure 5:
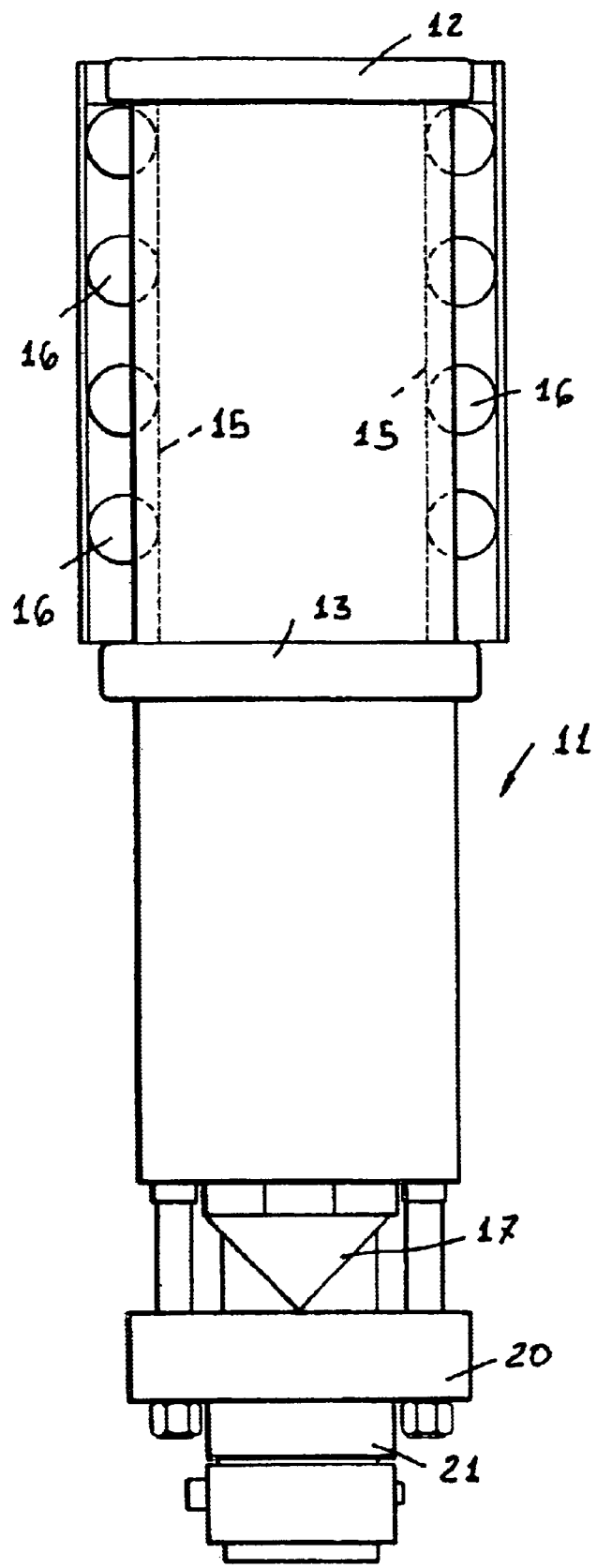
FIG. 5 illustrates the piston of the shock-absorbing element shown in FIG. 4.

The shock absorbing element, as clearly shown in FIGS. 4 and 5, comprises a coating construction 10, arranged at the top, and in which a piston 11 can slide.

Said piston 11 is provided with a top limit ring-nut 12 and an extension detent ring nut 13, arranged above the oil guard element 14, coupled to the coating construction.

In order to prevent said piston from turning with respect to the coating construction coupled to the motorcycle chassis, guides 15, defined both on the piston body and on the coating construction 10 are provided, in said guides 15 being arranged respective balls 16 for facilitating the mutual sliding movement and for holding a desired axial aligning relationship.

Advantageously, said balls are driven in channels defined by said guides 15, communicating with oil channels.

At the bottom thereof, the piston 11 is coupled to a snug guide 17 in the shape of an inverted pyramid, and being coupled to a locking plate 20 for locking said fork, thereunder a precision spacing washer 21 is arranged.

Said spacer washer 21, in particular, is arranged between said plate 20 and a safety counter-plate 22.

Thus, the above disclosed device, allows to provide a motorcycle fore-end assembly, including a single shock absorbing element, arranged on the motorcycle wheel median plane.

Thus, it is possible to obtain a great reduction of the motorcycle chassis weight, and a very good load balance.

The braking assembly for braking the motorcycle wheel can be made according to any conventional desired methods.

Such a braking assembly, in particular, owing to its constructional features, allows to easily apply a brake disc of a double caliper type.

The brake calipers, in particular, can comprise either one or more caliper plungers with independent oil circuits.

In fact, it is possible to optimize their constructions and operations.

From the above disclosure it should be apparent that the invention fully achieves the intended aim and objects.

In particular, the fact is to be pointed out that the invention provides a fore-end assembly for motorcycles of very reduced weight, while providing very good mechanical and strength characteristics.

The invention, as disclosed, is susceptible to several modifications and variations, all of which will come within the scope of the invention.

Moreover, all the constructional details can be replaced by other technically equivalent elements.

In practicing the invention, the used materials, as well as the contingent size and shapes, can be any, depending on requirements.

What is claimed is:

1. A fore-end assembly for a motorcycle having a chassis, a front wheel, and a rear wheel, the front wheel having a median plane transverse to a central rotational axis, the fore-end assembly comprising
    a single shock absorbing element coupled to said motorcycle chassis, and supporting, at a bottom portion thereof, an arm for supporting said front wheel,
        the shock absorbing element having a median plane through its length,
            this median plane being substantially parallel to the median plane of said front wheel,
        the shock absorbing element being a tubular shock absorbing element in which telescopically slides a piston,
            wherein said piston comprises a limit top ring nut, an extension detent ring nut, and anti-rotation means for preventing said piston from rotating in said tubular shock absorbing element.

2. A fore-end assembly, according to claim 1, wherein said anti-rotating means comprise a plurality of balls, engaged in ball guides respectively defined by said piston and by an inner surface of said tubular shock absorbing element.

3. A fore-end assembly, according to claim 2, wherein said assembly comprises, at a bottom end portion of said tubular shock absorbing element, oil-guard means.

4. A fore-end assembly, according to claim 2, wherein said assembly comprises oil supplying channels extending through said plurality of balls.

5. A fore-end assembly, according to claim 1, wherein said piston is coupled, at a bottom portion thereof, to a precision guide shaped as an inverted pyramid, for coupling to a motorcycle fork.

6. A fore-end assembly, according to claim 5, wherein said piston is coupled, at said bottom portion thereof, to a plate, in turn coupled, through a precision spacer washer, to a primary counter-plate for locking said fork.

* * * * *